METHOD FOR MAKING YARN BY FIBRILLATION
OF RIBBONS OF PLASTIC MATERIAL
Original Filed Jan. 8, 1968

CHARLES W. KIM
STANLEY D. SAMLUK
*INVENTORS*

BY Edward L. Bell

ATTORNEY

United States Patent Office

Re. 27,727
Reissued Aug. 14, 1973

27,727

METHOD FOR MAKING YARN BY FIBRILLATION OF RIBBONS OF PLASTIC MATERIAL

Charles W. Kim, Heritage Park, Wilmington, and Stanley D. Samluk, Chestnut Hill, Newark, Del., assignors to Hercules Incorporated, Wilmington, Del.

Original No. 3,495,752, dated Feb. 17, 1970, Ser. No. 822,625, May 7, 1969, which is a division of application Ser. No. 696,376, Jan. 8, 1968. Application for reissue Nov. 23, 1970, Ser. No. 92,334
Int. Cl. B26f *3/02*
U.S. Cl. 225—3 9 Claims

Matter enclosed in heavy brackets [ ] appears in the original patent but forms no part of this reissue specification; matter printed in italics indicates the additions made by reissue.

ABSTRACT OF THE DISCLOSURE

The present invention relates to a method for making a bulky synthetic fiber with a spun-like appearance by fibrillation of a ribbon of straited film of plastic material that has been oriented predominantly uniaxially in the direction of the striations, the method comprising a serrated edge means that engages the ribbon periodically and includes teeth that contact the ribbon on alternate engagements at points spaced laterally of the ribbon. Preferably, the serrated edge means comprises a threaded rod slabbed to provide a plurality of relatively sharp edges having teeth formed by the original screw thread and which progress spirally of the rod.

This application is a division of our prior application Ser. No. 696,376, filed Jan. 8, 1968.

The present invention relates to a method for making continuous filament yarn from a plastic material such as polypropylene, and particularly to such a method wherein the yarn is formed by the fibrillation and uniaxially oriented striated ribbons of such material. As herein used, the term "uniaxially oriented" refers to a ribbon that is predominantly oriented uniaxially although some limited level of biaxial orientation may be present.

The objects of this invention are to provide a method for splitting a uniaxially oriented striated ribbon into a plurality of continuous filaments, which method is simple, economical, efficient and reliable, and is adapted to produce a variety of products with different orientation levels.

The filaments in accordance with this invention may have laterally projecting fins on opposite sides thereof which improve the bulk and packing resistance and resilience of the filaments over that of conventional continuous filaments, or may have laterally projecting short length fibrils which not only impart improved bulk to the filaments but also the spun-look appearance of yarn made from staple, or may have a network of fibrils interconnecting the filaments in a net-like structure. The filament may also consist of a plurality of striations, e.g., two striations and the interconnecting web, that has not been separated.

In accordance with this invention, a striated ribbon of polymeric material that has been uniaxially oriented in the direction lengthwise of the striations is engaged by a serrated edge whereby the teeth of the edge penetrate the film and separate it into individual continuous filaments with lateral protrusions that may define fins, fibrils or an interconnecting fibril network. The degree of fibrillation as well as the character, cross-sectional dimensions, and the uniformity of the filaments and of the lateral protrusions are controlled by controlling the characteristics of the ribbon, the dimensioning of the serrated edge, and the speed of the serrated edge relative to the ribbon.

With the above and other objects in view, the present invention is hereinafter described with reference to the accompanying drawings, in which.

Figure 1:
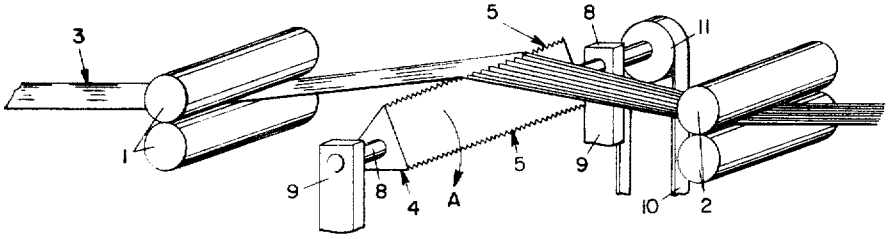
FIG. 1 is a schematic illustration of apparatus embodying the present invention.
Figure 2:
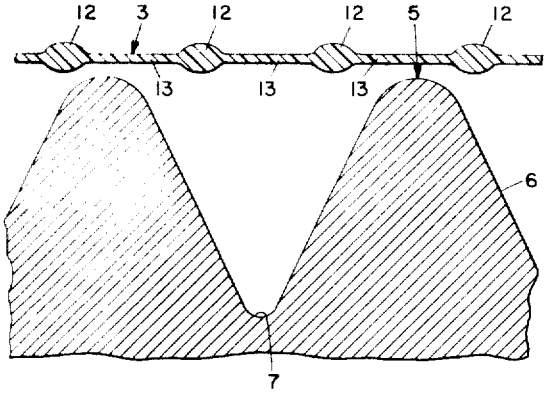
FIG. 2 is a fragmentary detail sectional view of a short transverse section of the ribbon and the serrated edge of the beater of FIG. 1, both illustrated in true scale at a magnification of 110×.
Figure 3:
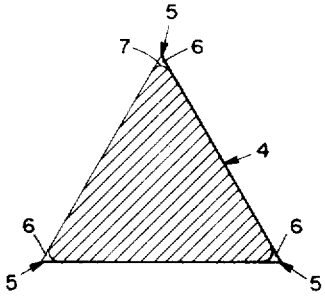
FIG. 3 is a transverse sectional view of the beater of the apparatus of FIG. 1.

With reference to the drawings, there is illustrated schematically in FIG. 1 apparatus for practicing the method of this invention comprising feeding mechanism including a pair of feed rolls 1 and a pair of draw rolls 2 for feeding a ribbon 3 of striated plastic. The space between the feed rolls 1 and draw rolls 2 defines what is herein termed the fibrillation zone and the rolls 1 and 2 are driven at speeds such as to maintain the section of ribbon 3 in this zone under tension. The tensioned length of the ribbon 3 in the fibrillation zone is engaged by a fibrillating means which, in the illustrated form, comprises a beater 4 having a cross section defining an equilateral triangle. The edges 5 of the beater are serrated to define teeth 6 and valleys 7 (FIG. 2). The beater 4 is journaled for rotation about its axis by means of a shaft 8 mounted at its opposite ends in supports 9. Rotation in the direction of the arrow A is imparted to the beater 4, for example, by a belt 10 entrained about a pulley 11 on one end of the shaft 8. The beater 4 is mounted with its axis substantially parallel to the pinch lines defined by the feed rolls 1 and draw rolls 2 and is offset from a straight line between the pinch lines so that the ribbon 3 is deflected over the edges 5 of the beater 4.

The ribbon 3 comprises a thin strip of thermoplastic material such as polypropylene, and, as illustrated in FIG. 2, is striated, or other words, is provided with a series of substantially uniformly spaced parallel ribs or striations 12 running longitudinally thereof and interconnected by webs 13 of reduced thickness. The ribbon 3 is oriented uniaxially in the direction parallel to the striations 12. With uniaxial orientation, the tensile strength of the ribbon in the direction of the axis of orientation is greatly increased but the strength transversely is reduced so that the ribbon can be readily split lengthwise. In comparison with the webs 13, the striations 12 have a relatively high resistance to splitting, so lengthwise splitting of the ribbon is generally confined to the webs 13 and the resulting filaments correspond generally to the striations 12.

In the operation of the apparatus of FIG. 1, the ribbon 3 is advanced by the draw rolls 2 from the feed rolls 1, with the section of the ribbon between them, that is, the section in the fibrillation zone, being under tension and angled over the beater 4. As the beater 4 is rotated in the direction of the arrow A, the edges 5 are successively brought into engagement with the ribbon along lines transversely thereof with each successive line of engagement spaced upstream of the ribbon from the preceding line of engagement. After engagement, the edge 5 is advanced along the ribbon and then carried out of engagement with it. With the ribbon 3 under tension, the teeth 6 of the edges 5 penetrate the ribbon thereby separating it into filaments.

Figure 4:
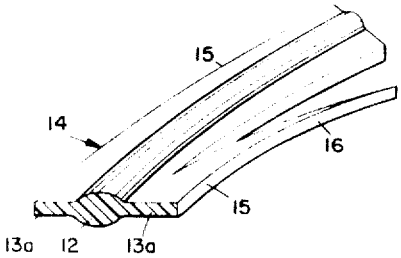
FIG. 4 is a perspective view of a short length of one form of filament produced by the fibrillation of the ribbon in the apparatus of FIG. 1.
Figure 5:
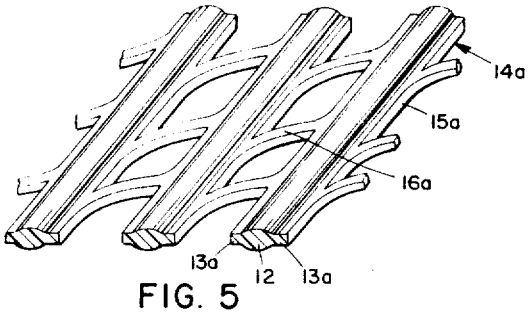
FIG. 5 is a view similar to FIG. 4 of a network structure produced by the fibrillation of the ribbon in the apparatus of FIG. 1.
Figure 6:
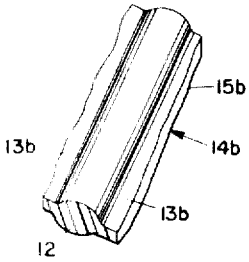
FIG. 6 is a perspective view similar to FIG. 4 of another form of filament produced by the fibrillation of the ribbon in the apparatus of FIG. 1.
Figure 7:
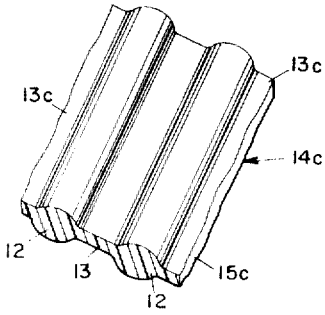
FIG. 7 is a perspective view similar to FIG. 4 of another form of filament produced by the fibrillation of the ribbon in the apparatus of FIG. 1.

The product that is produced may comprise individual continuous filaments 14 with laterally projecting side fibrils 16 as illustrated in FIG. 4, or filaments 14b with side fins 13b as illustrated in FIG. 6, or a net-like sheet of spaced and parallel filaments 14a interconnected by a web of fibrils 16a as illustrated in FIG. 5, or a plurality of unseparated striations as illustrated in FIG. 7. More particularly, the filaments 14 with side fibrils as illustrated in FIG. 4 comprise a backbone corresponding to a striation 12 of the ribbon and portions 13a of the adjacent webs 13 which terminate in edges 15 along which the webs were split to separate each striation from the adjacent striations in the ribbon 3. At the edges 15 there are relatively short laterally extending side fibrils 16. Because the fibrils 16 are formed from the webs 13, they are finer than the striations 12. When the filaments are combined into a yarn, the fibrils 16 produce a so-called spun-like appearance and a soft hand, and also provide a more bulky yarn with improved insulation and lighter weight. The product is substantially the same as that disclosed and claimed in the copending application of Hall and Kim, Ser. No. 674,332, filed Oct. 10, 1967.

In FIG. 5, the illustrated product comprises filaments 14a that, like the filaments 14 of FIG. 4, include backbones corresponding to the striations 12 of the ribbon and portion 13a of the adjacent webs 13. Extending laterally from the edges 15a of the filament are fibrils 16a which are similar to the fibrils 16 except that they are not separated from one of the adjacent filaments between which they are formed and thus comprise a web interconnecting the adjacent filaments. The filaments 14a can be readily aligned in spaced parallel relation simply by spreading the net-like structure.

The product illustrated in FIG. 6 comprises a filament 14b having a backbone corresponding to a striation 12 and laterally projecting fins 13b corresponding to the webs 13 of the ribbon 3. This product is characterized by the absence of any fibrils such as the fibrils 16 and 16a extending laterally from the edge 15b of the fins 13b.

The product illustrated in FIG. 7 comprises a filament 14c having a pair of spaced striations 12 interconnected by a web 13 that has not been split, and fins 13c, like the fins 13b, that extend laterally from the striations 12 on the sides opposite from the unsplit web 13.

Whether there will be complete fibrillation or separation of the ribbon into individual filaments with side fibrils or side fins, or whether there will be a random incomplete separation or the formation of a net-like structure depends (1) upon the number of teeth 6 that engage between each pair of striations 12 along each unit of length of the ribbon, which in turn depends upon the speed of the beater 4 relative to the speed of the ribbon 3 as well as the number of edges 5 and the number per inch or gauge of the teeth 6 along the edge 5 relative to the spacing or gauge of the striations 12 in the ribbon, (2) upon the arc through which the teeth move while in engagement with the ribbon, which itself is determined by the angle of the ribbon 3 over the beater 4, or in other words, by the elevation of the beater relative to a straight line between the pinch lines of the feed rolls 1 and of the draw rolls 2, (3) upon the lateral weakness or splittiness of the ribbon, which is a function of the orientation level and (4) upon the dimensioning of the teeth 6, that is, the sharpness of the point and the depth of the tooth as well as its width at the base.

Without limiting the invention to any specific theory, it would appear that the fibrils 16 and 16a are formed by the lateral wandering of the molecular orientation of the material, which is reduced as the orientation level increases but is present even in highly oriented materials. Thus when a web 13 is split successively between two adjacent striations 12 at points spaced lengthwise of the ribbon, some molecules of material wander laterally between the two splits and prevent the splits from joining end-to-end. These molecules initially forms fibrils interconnecting adjacent striations 12 in the manner illustrated in FIG. 5. If the arc of engagement of the tooth on the ribbon is sufficiently long, these fibrils, or some of them, are separated at one end from the adjacent filaments by a tooth passing between each fibril and the filament until the fibril runs-out to a fine free end. As the level of orientation is decreased, the progressive decrease in the molecular alignment effects a corresponding reduction in the length of the fibrils until, at a very low orientation level such as 2:1, the filaments have side fins 13b instead of fibrils.

The radius of curvature or sharpness of the points of the teeth 6 is important in that, for any given level of orientation of the ribbon, the sharpness defines the pressure required in order for the tooth to penetrate the ribbon. In the usual fashion, a sharp point concentrates the pressure on a small contact area so that the stress at the point is relatively high while a blunt point distributes the pressure over a larger area and the stress is proportionally lower. Thus, the sharp point more readily separates or splits the ribbon. The limits on the sharpness of the tooth is that the point must not be so sharp that it will penetrate a striation 12 if it should come into contact with it and must not be so blunt that in combination with the other relevant factors discussed below it will not split the ribbon. Generally, a tooth with a radius of curvature at its point that is equal to or less than the radius of the striations 12 would tend to penetrate the striation rather than push it aside.

For any given tooth profile and impact conditions, the orientation level of the ribbon determines the pressure required for a tooth to split the ribbon and to some extent, the character of the filament. At one extreme, the orientation level may be so low and the lateral strength correspondingly so high relative to the sharpness of the tooth and the engagement pressure or impact forces, that the tooth will not split the ribbon. At the other extreme, with a very high level of orientation, the ribbon may be so weak laterally that it will split on contact even by a tooth that is quite blunt. Between these extremes as the level of orientation decreases and the lateral strength correspondingly increases, increased pressure is required to effect splitting.

One of the features of this invention is that, as the tensile stresses in the ribbon increase as a tooth 6 moves into engagement with the ribbon and insofar as there is any unbalance in these stresses, the ribbon will shift relative to the tooth until the stresses are balanced. With a ribbon having a relatively high lateral strength, balancing of the forces at a splitting pressure occurs when the tooth is generally centered relative to a pair of adjacent striations. With a ribbon that it relatively weak laterally, splitting pressure is lower and, in an extreme case, may be developed in the ribbon merely by impact of the tooth on the ribbon regardless of the location of the point of impact laterally relative to the striations, or, in a ribbon having a lower orientation level, subsequently as the contact pressure and thus the tensile strength in the ribbon increases and the ribbons tends to shift to balance the stresses. Generally, splitting will occur toward the lateral midpoint of the webs 13 so that the resulting filaments are quite uniform in cross section. A significant advantage of the present invention is that the relatively blunt teeth 6 do not tend to wear as does a sharp point and there is need for frequent sharpening.

The production of a filament with side fins as illustrated in FIG. 6 would appear to be a function of the use of a tooth that is relatively blunt with a ribbon that has a relatively low level of orientation and is therefore quite strong laterally and with the successive edges 5 engaging the ribbon at relatively short intervals lengthwise of the ribbon. In these circumstances, the unbalancing of the tensile stresses in the ribbon caused by the split made by the preceding tooth, apparently shifts the ribbon relative to the tooth or defines a stress concentration point so that the tooth extends the preceding split rather than forms a new split separated from the preceding split by laterally wandering fibrils. With a combination of tooth profile, orientation level and contact pressure that permits the tooth to enter into the preceding split, the tooth can elongate the preceding split smoothly. With a lower level of orientation and thus with a tougher ribbon, or with an increased spacing of the intervals at which the edges engage the ribbon, a tooth may initiate a new split that, in the absence of the well-defined lines of weakness associated with a high level of orientation, runs into or connects with the split made by the preceding tooth but forms a jagged edge as at 15b in FIG. 6. By way of example, in one instance when a ribbon having an orientation level of about 3 to 1 was fibrillated, filaments such as shown in FIG. 6 were obtained. When the orientation level of the ribbon was about 6 to 1, filaments with fibrils such as shown in FIG. 4 were obtained.

The filaments illustrated in FIG. 7 are formed by a beater 4 in which the corresponding teeth 6 of the successive edges 5 are aligned angularly of the beater or, in other words, are positioned in a plane normal to the axis of the beater so that they define series of teeth traveling in the same circular paths. In this arrangement, the successive teeth in each series tend to enter in succession between the same two striations and, in fact, since the film is unable to recover sufficiently fast from the separation made by the penetration of the preceding tooth, each tooth tends to enter into the same split that was made by the preceding tooth. Thus the ribbon is separated or split along lines extending longitudinally of the ribbon. The lines along which the ribbon is split are spaced laterally of the ribbon at intervals determined by the lateral spacing of the teeth 6 relative to that of the striations 12. With a ribbon and an edge in which the teeth are spaced at a distance that is a mlltiple of the spacing of the striations, the resulting product will be as shown in FIG. 7 with different relative spacings of the teeth 6 and striations 12, the filaments may comprise one or more striations, or, in the fibrillation of a single ribbon, the different filaments may comprise different numbers of striations as the ribbon is split into filaments having widths that accommondate the lateral spacing of the teeth 6.

With a ribbon that is advanced at a speed relative to the speed of the beater 4 whereby the stroke of successive teeth in a single circular path do not overlap, the filaments 14c as shown in FIG. 7 may be formed into a net-like structure similar to that of FIG. 5. Whether the filaments 14c will have smooth edges 15c or fibrils such as the fibrils 16 will be determined for example by the orientation level of the film and by the intervals at which the successive teeth engage the ribbon.

Another feature of the present invention is that the teeth need not be matched to the number of striations in order to achieve complete separation of each striation. With a beater 4 in which each tooth 6 on an edge 5 engages the ribbon 3 at a point displaced laterally of the ribbon from the point engaged by the corresponding point on the preceding edge 5, the successive teeth will not tend to follow in succession in the same split between two striations. On the contrary, the successive engagements of the teeth 6 on the ribbon are at laterally spaced points. Thus, in order to effect complete fibrillation, the only requirement is that there be a sufficient number of teeth engaging the film between each striation in each linear inch, e.g., 3 to 4, to effect complete separation of those two striations. This can be achieved by providing a plurality of individual edges and by increasing the speed at which the beater 4 is rotated. Thus, for example, a ribbon having about 65 striations per inch can be completely fibrillated by a beater 4 that is triangular in cross section and thus has three of the edges 5, each with about 40 teeth per inch. With the teeth of the successive rows spaced progressively in a uniform fashion endwise of the beater 4, there are in effect provided 120 teeth per inch along the beater 4 so that the engagement by one tooth between each striation upon each revolution of the beater 4 is virtually assured. By rotating the beater 4 at a speed that is sufficiently high relative to the speed at which the ribbon 3 is advanced, the desired number of strokes per inch can be effected.

The fact that the teeth need not be matched with the striations of the ribbon is significant because of the difficulty in achieving uniform spacing of the striations in the ribbon. With relative wide ribbons, necking at the edges reduces the spacing of the striations at the edges relative to the spacing of the striations at the center of the ribbon. Narrow ribbons are relatively expensive to process. The extremely fine spacing of the striations in a film adapted to produce fine filaments, such as filaments of three denier or so, make it impractical to construct a beater 4 with teeth matched to the striations of the ribbon or teeth that effect a relatively large separation between striations.

It will of course be obvious that combinations of edges, teeth gauge and speed other than as noted above can be used to effect substantially identical results. In fact, combinations of edges and teeth that define a number of points of contact on the ribbon that are less than the number of striations can also be used, for example, a triangular arrangement of three of the edges 5 having twenty of the teeth 6 per inch to provide in effect sixty points of contact will successfully fibrillate a ribbon 3 having 65 striations per inch when the beater 4 is operated to engage the ribbon at about fifteen edges per linear inch. In such a case, it would appear that the random movements of the ribbon and the lateral displacement of successive teeth between successive engagements prevent the establishment of a static condition and assures that each web will be engaged by the teeth 6 a sufficient number of times to effect fibrillation. Hexagonal and star-shaped beaters have also been used successfully.

Inasmuch as the teeth need not be matched with the striations of the film, the ribbon and the beater can both be made significantly less expensively. The teeth 6 of the beater can be made quite coarse relative to the striations of the ribbon and there is no requirement that they be made with great accuracy. A coarse tooth can also be an advantage since it tends to force the striations further apart and thereby effect a wider splitting or wedging of the striations at the point where the tooth penetrates, which appears to enhance the formation of fibrils.

A preferred arrangement of the teeth 6 is in the shape of a screw thread progressing spirally of the beater 4. Thus, the beater 4 can be formed simply and inexpensively by slabbing a threaded rod having a diameter equal to the desired diameter of the beater, and the teeth of the successive edges are equally spaced progressively endwise or axially of the beater. Not only can such a beater be made inexpensively, but it also has the advantage that the individual teeth, being segments of a screw thread, are slightly canted so that as each tooth engages the ribbon, it tends to shift the ribbon laterally. This action would appear to have the advantage that the vibration of the ribbon as it is continually shifted sideways when it is engaged by an edge and recovers when it is released by the edge, assures engagement of the teeth on the ribbon at each web. Because the teeth in the form of a screw thread urge the ribbon axially of the beater in the direction of the original thread, it is necessary that the ribbon be released or substantially released by each edge before it is engaged by the successive edge.

Another feature of the present invention is that the ribbon is substantially released by each edge before it is engaged by the succeeding edge. In this manner, each edge impacts against the ribbon as the ribbon is alternately extended and relaxed by the successive edges. The impact improves fibrillation while the alternate release of the ribbon prevents the accumulation of any unbalanced forces such as the lateral bias imposed by the canted teeth noted above. To achieve substantial release of the ribbon between successive engagements by the serrated edges, the number of edges and thus the angular spacing of them, as well as the included angle of the ribbon over the beater 4 must be limited so that the one edge is substantially free of the ribbon before the following edge engages it. Because the teeth are substantially flat or parallel relative to the ribbon both when it engages and when it disengages the ribbon, even with a certain amount of overlap, the ribbon will be substantially released by one edge and thus free to adjust laterally before it is actually seized by the teeth of the following edge.

To illustrate the various products produced by the method of this invention, with a bar 4 that was one and one-half inches in diameter and having forty teeth per inch on the edges thereof and with a polypropylene ribbon having about sixty-five striations per inch and an orientation level of about 6:1, it was found that operating the beater and ribbon at speeds at which the ribbon was engaged by six to eight edges per inch, which was about three and one-half to five teeth between each adjacent striation in each linear inch of ribbon, produced a completely fibrillated ribbon with fibrils corresponding generally in number to the number of teeth per inch per pair of striations. When the apparatus was operated to engage each inch of film with three to four edges, that is, about two and one-half teeth between each pair of ribs in each inch of film, there was produced a net-like structure such as illustrated in FIG. 5 with incomplete separation between the ribs. When the relative speed of the ribbon and beater was adjusted so that the ribbon was engaged by about fourteen to sixteen edges per inch (about nine teeth per inch between each pair of ribs), the yarn begins to look fuzzy because excessive abrasion of the filaments tends to produce a large number of very short fibrils and there are broken filaments. At about eighteen to twenty edges per inch (about ten to eleven teeth per inch per pair of ribs), the ribbon is virtually destroyed because of the large number of broken filaments.

It will of course be apparent that with variations in the number of edges that engage each inch of ribbon, there is a corresponding variation in the length of the stroke of each edge on the ribbon because the speed of the ribbon relative to the edge is also varied, or in other words, with only a few edges per inch of ribbon, the speed of the ribbon more nearly matches the speed of the edges so that the stroke of the edge on the ribbon is quite short whereas, on the other hand, with a large number of edges per inch of ribbon, the speed of the beater is proportionally greater than the speed of the ribbon and has a longer stroke on the ribbon.

To illustrate the present invention by way of a specific example, a striated polypropylene ribbon was extruded through a die with rib openings that were round in cross section and had a diameter of about 0.014" with interconnecting web openings having a thickness of about 0.002" and with a gauge or spacing from a point on one rib opening to the corresponding point on the adjacent rib opening of about 0.024". The ribbon was melt drawn at a ratio of 4:1 and was subsequently oriented at a draw ratio of about 6:1. In the oriented ribbon, which in true scale at 110× magnification is substantially as illustrated in FIG. 2, the ribs had a thickness of about 0.003", the webs had a thickness of about 0.0005, and the spacing from a point on one rib to the corresponding point on the adjacent rib was about 0.010". This ribbon was fibrillated by passing the same under tension over a beater with the legs of the ribbon defining an included angle of 150°. The beater was formed from a threaded rod that was 0.5 inch in diameter having 40 threads per inch, the rod being slabbed to a triangular cross section. The rod was rotated at a speed of 3600 r.p.m. and the ribbon was advanced at the rate of 100 feet per minute. The ribbon was substantially completely fibrillated to provide yarn having individual filaments of about 35 denier each and having about 6 side fibrils per inch, with the majority of them ranging up to about one-quarter inch in length.

While the present invention is described above in connection with polypropylene, it will be apparent that it is not limited to such material. On the contrary, there can be used any thermoplastic polymer such as nylon, polyacrylonitrile, polyvinyl chloride, polyethylene, or polyesters, that is capable of being formed as an oriented striated ribbon.

From the above, it will be seen that the method of this invention is adapted to produce a variety of different types of continuous filaments from a ribbon of striated plastic film. These products include continuous filaments interconnected by web-like fibrils into a net-like structure, or individual continuous filaments having laterally projecting side fibrils or fins. In each case, the filaments are uniform in cross section and when combined into a yarn will provide a uniform hand and appearance. The filaments can also be made relatively fine without excessive broken filaments. A further significant feature is that filaments can be made within a range of orientation levels and are not limited only to a high orientation level. While the high level of orientation improves tensile properties, there are many applications where those properties are not significant, such as in carpet yarns. The high orientation level also decreases other properties such as resilience and packing resistance which are important for example in carpet yarn.

It is also possible to process flat or non-striated ribbons in accordance with this invention. However, since that film does not have the well-defined lines of weakness comparable to the webs 13 of the striated film, there is less tendency for the teeth to shift the ribbon laterally and a corresponding increased tendency for the teeth to split the film at the point of contact. Thus, the present method would not form continuous filaments but could however be used to form a net-like structure or a net-like structure with fiber-like ends.

What we claim and desire to protect by Letters Patent is:

1. A process for making a synthetic yarn from a ribbon of plastic material comprising, providing a ribbon uniaxially oriented endwise thereof, advancing the ribbon endwise under tension through a fibrillation zone, providing a serrated edge means arranged substantially transversely of the ribbon in said fibrillation zone, actuating said serrated edge means in a cycle of movement including movement periodically into and out of engagement with the ribbon in said fibrillation zone for deflecting said ribbon and thereby increasing the tension therein while said edge means and ribbon are in engagement, and permitting the ribbon to recover from the deflection as said edge means moves out of engagement therewith, whereby said ribbon is substantially split endwise into a plurality of individual filaments.

2. A process in accordance with claim 1 in which said serrated edge means that is provided comprises a plurality of angularly spaced free edges each of which has teeth that are axially offset relative to the corresponding teeth of the other of said free edges.

3. A process in accordance with claim 2 in which the teeth of the free edges define a screw thread progressing spirally in one direction endwise of said serrated edge means.

4. A process in accordance with claim 1 in which said serrated edge means that is provided comprises a plurality of angularly spaced free edges and said edge means is rotated about the axis thereof for moving the free edges thereof periodically into and out of engagement with said ribbon.

5. A process in accordance with claim 1 in which the ribbon provided is formed with a plurality of striations extending lengthwise thereof in substantially uniformly spaced and parallel relation and has a web of reduced thickness laterally interconnecting each pair of adjacent striations, in which the serrated edge means that is provided has a plurality of teeth substantially uniformly spaced at intervals greater than the intervals between the striations of the ribbon, and in which the teeth of the edge means engage the ribbon at points spaced laterally of the ribbon upon successive engagements during the actuation of the edge means, whereby the ribbon is substantially split into a plurality of individual continuous filaments substantially corresponding to the striations.

*6. A process for making a synthetic network structure from a ribbon of plastic material comprising, providing a ribbon uniaxially oriented endwise thereof, advancing the ribbon endwise under tension through a fibrillation zone, providing a serrated edge means arranged substantially transversely of the ribbon in said fibrillation zone, actuating said serrated edge means in a cycle of movement including movement periodically into and out of engagement with the ribbon in said fibrillation zone for deflecting said ribbon and thereby increasing the tension therein while said edge means and ribbon are in engagement, and permitting the ribbon to recover from the deflection as said edge means moves out of engagement therewith, whereby said ribbon is partially split into a network structure.*

*7. A process in accordance with claim 6, in which the ribbon provided is formed with a plurality of striations extending lengthwise thereof in substantially uniformly spaced and parallel relation and has webs of reduced thickness laterally interconnecting each pair of adjacent striations, and in which the serrated edge means partially splits the webs of said ribbon to form a network structure having a plurality of continuous longitudinal filaments interconnected by fibrils.*

*8. A process for making a synthetic network structure from a ribbon of plastic material comprising, providing a ribbon uniaxially oriented endwise thereof, advancing the ribbon endwise under tension through a fibrillation zone, providing a beater having a plurality of serrated edges arranged substantially transversely of the ribbon in said fibrillation zone, actuating said beater to move each serrated edge periodically into and out of engagement with said advancing ribbon to fibrillate said ribbon into a network structure.*

*9. A process in accordance with claim 8 in which the ribbon provided is formed with a plurality of striations extending lengthwise thereof in substantially uniformly spaced and parallel relation and has webs of reduced thickness laterally interconnecting each pair of adjacent striations, and in which the serrated edges partially split the webs of said ribbon to form a network structure having a plurality of continuous longitudinal filaments interconnected by fibrils.*

References Cited

The following references, cited by the Examiner, are of record in the patented file of this patent or the original patent.

UNITED STATES PATENTS

| | | | |
|---|---|---|---|
| 2,598,866 | 6/1952 | Warp | 264—284 |
| 3,273,771 | 9/1966 | Beaumont | 225—3 |
| 3,309,452 | 3/1967 | Yumoto et al. | 264—284 |
| 3,329,557 | 7/1967 | Magat et al. | 161—174 X |
| 3,468,461 | 9/1969 | Rasmussen | 264—147 X |
| 3,470,594 | 10/1969 | Kim | 28—1 F X |
| 3,470,685 | 10/1969 | Hall et al. | 28—1 F X |
| 3,490,664 | 1/1970 | Boultinghouse | 225—3 X |
| 3,503,836 | 3/1970 | Rasmussen | 28—1 F X |
| 3,369,435 | 2/1968 | Boultinghouse | 28—1 X |
| 3,293,844 | 12/1966 | Winniger et al. | 57—157 |
| 3,460,337 | 8/1969 | Feild | 57—140 |
| 3,496,259 | 2/1970 | Guenther | 264—DIG 47 |
| 3,496,260 | 2/1970 | Guenther et al. | 264—DIG 47 |
| 3,500,627 | 3/1970 | Kim | 28—DIG 1 |

OTHER REFERENCES

Griff, Alan A., Plastics Extrusion Technology, Reinhold, New York (1962), p. 78 relied on.

FRANK T. YOST, Primary Examiner

U.S. Cl. X.R.

28—DIG 1; 225—97